W. G. SMITH.
Car-Axle Box.
No. 45,124. Patented Nov. 15, 1864.
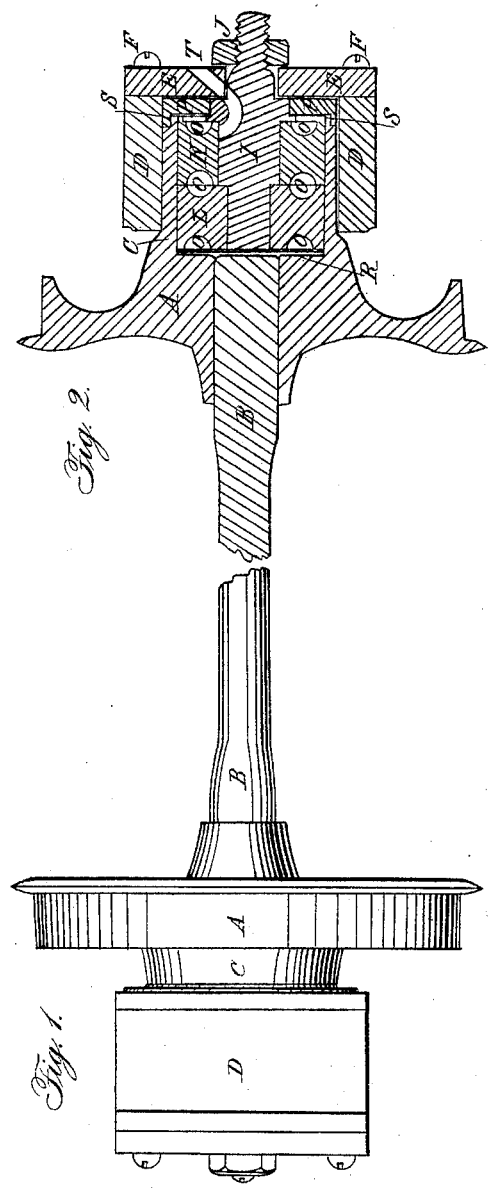
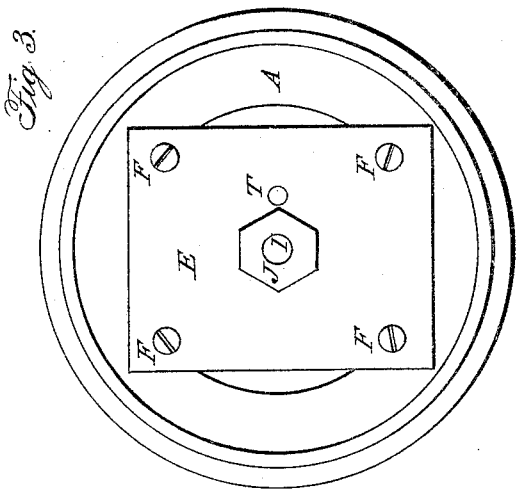
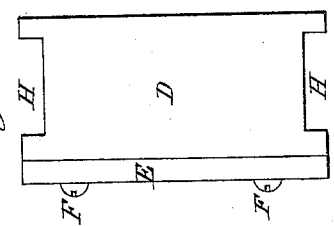
Witnesses:
John F. Barney
Jacob A. Wheeler
Inventor:
William Gebb Smith

UNITED STATES PATENT OFFICE.

WILLIAM G. SMITH, OF CHICAGO, ILLINOIS, ASSIGNOR TO HIMSELF, JOHN F. BARNEY, AND JACOB A. WILDER, OF SAME PLACE.

IMPROVEMENT IN RAILROAD-CAR JOURNALS.

Specification forming part of Letters Patent No. 45,124, dated November 15, 1864.

*To all whom it may concern:*

Be it known that I, WILLIAM G. SMITH, of Chicago, in the county of Cook and State of Illinois, have invented a new and useful Improvement in Car-Journals; and I do hereby declare that the following is a full, clear, and exact description of the same, reference being had to the accompanying drawings and letters of reference marked thereon, which form a part of this specification, and in which—

Figure 1 represents a side elevation of my invention as applied. Fig. 2 represents a vertical central sectional view of the same. Fig. 3 represents an end view; Fig. 4, an end view of the journal-box detached.

The nature of my invention consists in a short steel journal on which small friction-wheels are placed and working inside the hollow hub of the car-wheel.

To enable those skilled in the art to manufacture and use my invention, I will proceed to describe the same with particularity.

The same letters of reference refer to corresponding parts in the different figures.

A represents the car-wheel, and B the axle, which is fitted closely into said wheel, so as not to revolve therein.

C is the hub of the wheel, made hollow and with a very fine finish both inside and outside.

D is a solid journal-box that just fits onto the hub C.

E is the front plate of said box, and is fastened thereto by means of the screws F.

The journal I is made of steel, and has a very smooth surface and is connected to the journal-box by means of the nut J. The journal is made separate and independent from the shaft of the wheel, so that it can be made of steel, and susceptible of a high polish, and the superior hardness and smoothness of the steel journal very much diminishes the amount of friction. Moreover, should the journal be broken or become injured in any manner, it can readily be replaced, which would not otherwise be the case.

R and L are friction-wheels which slip onto the journal I and just fill the space inside of the hollow hub C. The journal I is constructed with shoulders, as shown, presenting a different diameter for each of the friction-wheels. The friction-wheels have grooves O in their sides, which constitute receptacles for oil. In the hollow hub C there is put, first, a thin metallic washer, K. There is also a metallic washer, P, which has a lip, S, extending over the lip on the edge of the hub C, to keep the oil from escaping. There may also be a thin leather washer put on inside of the metallic washer P.

T is the oil-passage for oiling said journal.

H H in Fig. 4 shows the shape of the journal-box, it being so constructed for the convenience of attachment to the car.

The chief advantages of my invention are that the journal can be made of steel and highly finished at a small cost, which, together with the friction-wheels, makes the friction much less than with ordinary journals, and at the same time the oil is all kept within the hub and really used, instead of running out, bedaubing the machinery, and going to waste; and, also, if the journal breaks, the box does not fall, but is supported by the hub.

The face or tread of the wheels L and R may be constructed slightly convex.

Having thus fully described my car-journal, what I claim as my invention, and desire to secure by Letters Patent, is—

1. The journal I, when disconnected from the shaft of the wheel, substantially as and for the purposes set forth.

2. Constructing a journal disconnected from the shaft, varying in size—that is, having two or more different diameters—substantially as herein described.

3. The combination and arrangement of the journal I, the friction-wheels R and L, and the hollow hub C, when constructed and operating substantially as specified.

4. The combination and arrangement of the journal I, the journal-box D, provided with the face-plate E, and the hub C, when constructed and operating substantially as herein delineated and set forth.

5. The combination and arrangement of the journal I, the washer P, and the hollow hub C, when arranged substantially as herein described

WILLIAM GIBB SMITH.

Witnesses:
JOHN F. BARNEY,
JACOB A. WILDER.